(12) United States Patent
Rangarajan et al.

(10) Patent No.: US 8,159,937 B2
(45) Date of Patent: Apr. 17, 2012

(54) SEAMLESS TREE CREATION AND MOVEMENT

(75) Inventors: Hari Narayanan Rangarajan, Milpitas, CA (US); Jyoti Raju, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 371 days.

(21) Appl. No.: 12/061,384

(22) Filed: Apr. 2, 2008

(65) Prior Publication Data

US 2009/0252064 A1 Oct. 8, 2009

(51) Int. Cl.
 *H04L 12/28* (2006.01)
(52) U.S. Cl. .......................... 370/228; 370/329; 370/338
(58) Field of Classification Search .................. None
 See application file for complete search history.

(56) References Cited

U.S. PATENT DOCUMENTS

| 7,724,708 | B2* | 5/2010 | Shiue et al. | 370/332 |
|---|---|---|---|---|
| 2003/0087642 | A1* | 5/2003 | Mazzara | 455/450 |
| 2005/0147071 | A1* | 7/2005 | Karaoguz et al. | 370/338 |
| 2006/0056344 | A1* | 3/2006 | Roy et al. | 370/329 |
| 2006/0072502 | A1* | 4/2006 | Crandall et al. | 370/329 |
| 2006/0073827 | A1* | 4/2006 | Vaisanen et al. | 455/436 |
| 2006/0280131 | A1* | 12/2006 | Rahman et al. | 370/256 |
| 2009/0168647 | A1* | 7/2009 | Holness et al. | 370/228 |

OTHER PUBLICATIONS

U.S. Appl. No. 12/061,399, filed Apr. 2, 2008, Rangarajan et al.

* cited by examiner

*Primary Examiner* — Nittaya Juntima
*Assistant Examiner* — Tito Pham
(74) *Attorney, Agent, or Firm* — Tucker Ellis LLP

(57) ABSTRACT

In an example embodiment, a beacon is sent on all available interfaces of a device comprising data indicating the operating parameters of all interfaces of the device. A beacon containing data about the configuration of a first interface and a second interface is sent on both the first interface and the second interface. The beacon may suitably comprise data indicating the protocol, channel, and spanning trees for the interface. If communication on the primary interface becomes unavailable, the data in the beacons can be used to facilitate switching communication to the secondary interface.

14 Claims, 3 Drawing Sheets

Figure 1:
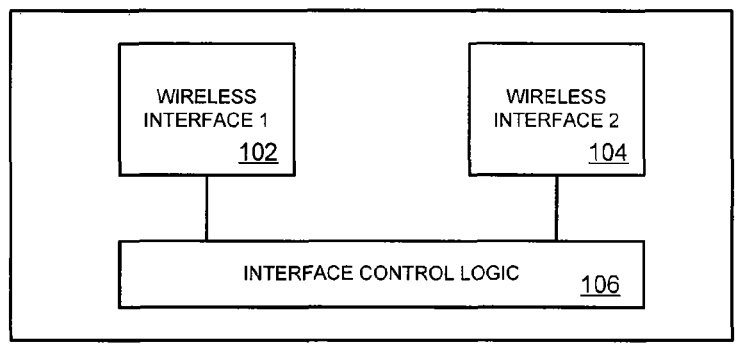

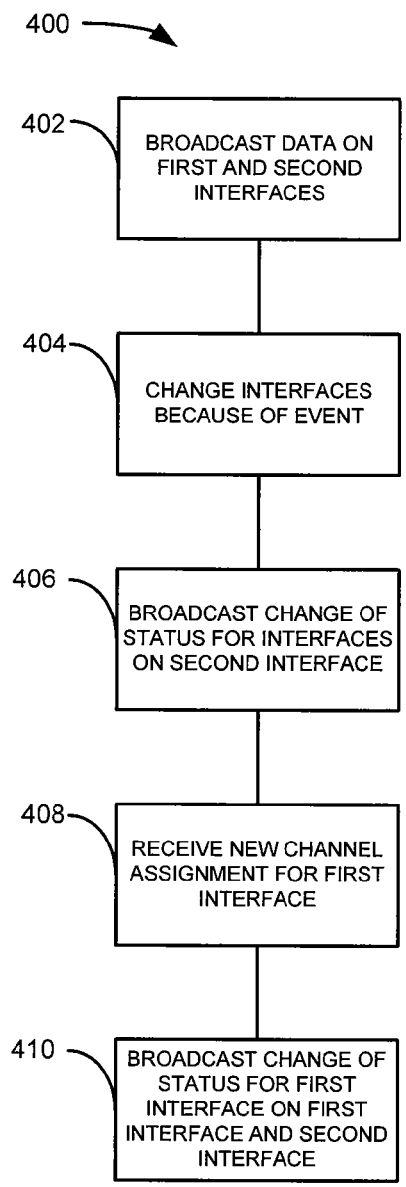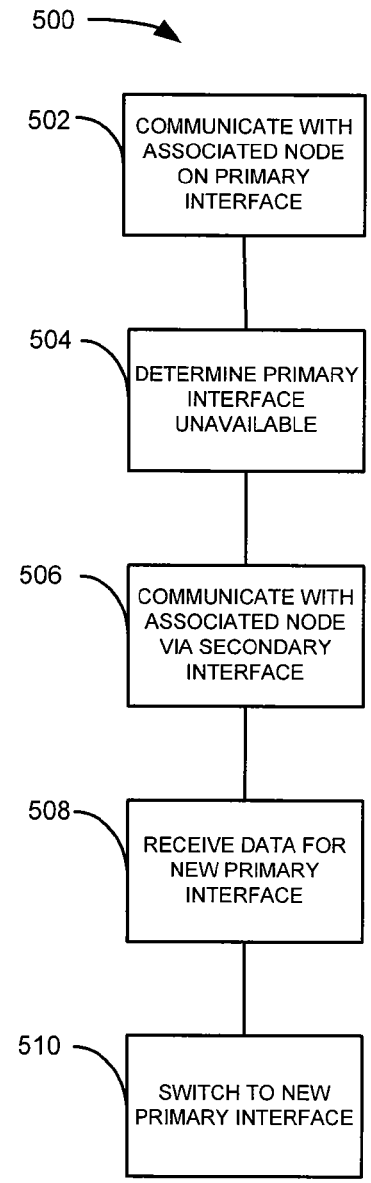
FIG. 4
FIG. 5

SEAMLESS TREE CREATION AND MOVEMENT

TECHNICAL FIELD

The present disclosure relates generally to wireless networks including wireless networks employing a wireless backhaul such as Mesh Networks.

BACKGROUND

The mesh architecture is a spanning tree that extends from the Root Access Point (RAP). A spanning tree is built by the RAP by advertising in the beacon that it intends to form a tree. The Mesh Access Points (APs) join this spanning tree by processing mesh beacons that are generated by the RAP. In the current scheme, the APs follow the RAP beacons to join the tree on the same frequency band and channel that the beacon is advertised on. So, when the RAP cannot use this frequency band and channel due to a radar event or a hardware failure, the Mesh Access Points (MAPs) do not receive the beacons any longer and they disconnect from the tree.

Another problem is that some wireless mesh networks, for examples those that are working in the 5 G DFS (5 Gigahertz Dynamic Frequency Selection) domain, may be required to move off channel when radar is detected. Moving off channel is inherently disruptive in DFS domains because the new channel requires a channel availability check (waiting for 60 seconds of silence) before an AP can transmit on the new channel. Meanwhile LWAPP (Lightweight Access Point Protocol) connections can time out and/or the routing tree can time out, disrupting data forwarding. Moreover, "false" radar detection further exacerbates the radar problem, creating unpredictable and unstable service.

BRIEF DESCRIPTION OF THE DRAWINGS

The accompanying drawings incorporated herein and forming a part of the specification illustrate the examples embodiments.

FIG. 1 illustrates an example of an apparatus configured in accordance with an example embodiment.

FIG. 2 illustrates an example of a Mesh network with nodes configured to implement an example embodiment.

FIG. 3 is a block diagram of a computer upon which an example embodiment can be implemented.

FIG. 4 is a block diagram of a method for a dynamic frequency selection device to change channels without disrupting an associated spanning tree.

FIG. 5 is a block diagram of a method for a dynamic frequency selection device to change channels responsive to receiving a beacon indicating an associated node has changed channels.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein, apparatus, comprising a first interface configured to use a first protocol on a first channel, a second interface configured to use a second protocol on a second channel and control logic coupled to the first interface and second interface, the control logic is operable to control and configure the first interface and the second interface. The control logic is operable to send a beacon on the first interface and the second interface. The beacon comprises data containing a current configuration of the first interface and a current configuration of the second interface.

In accordance with an example embodiment, there is described herein an apparatus, comprising a first interface configured to use a first protocol on a first channel, a second interface configured to use a second protocol on a second channel, and control logic coupled to the first interface and second interface, the control logic is operable to control and configure the first interface and the second interface. The control logic is operable to process a beacon received on one of a group consisting of the first interface, the second interface to determine a second interface for an associated device. The beacon comprises data containing a current configuration of the first interface of an associated device and a current configuration of the second interface of the associated device.

In accordance with an example embodiment, there is disclosed herein a method comprising wirelessly communicating with a device on a first interface, and receiving a beacon on the first interface, the beacon comprising data representative of a channel and spanning tree on the first interface and data representative of a configuration for a second interface. The method further comprises establishing communication with the device on the second interface responsive to an event inhibiting communication on the first interface, moving the spanning tree to the second interface and sending a second beacon on the second interface. The second beacon comprises data indicating the spanning tree has moved to the second interface.

In an example embodiment, there is disclosed herein a method comprising wirelessly communicating with a spanning tree through a device on a first interface. A beacon is received on a second interface from the device indicating the device is switching communications to a second interface of the device. The method further comprises configuring the second interface to communicate with the second interface of the device, and wirelessly communicating with the spanning tree through the device on the second interface of the device responsive to receiving the beacon.

Although the example embodiments disclosed herein are described in the context of a Mesh Network, those skilled in the art can readily appreciate that the principles described herein are applicable to any wireless networks that employ multiple interfaces. Moreover, an example embodiment disclosed herein discloses a dynamic frequency selection (DFS) embodiment that changes channels due to detecting a radar event. This is merely illustrative as the principles described herein are applicable to any wireless network employing DFS that may have to change channel due to an intervening event. Accordingly, it is intended that the claims appended to this application be interpreted to encompass all such equivalents.

Description Of Example Embodiments

This description provides examples not intended to limit the scope of the appended claims. The figures generally indicate the features of the examples, where it is understood and appreciated that like reference numerals are used to refer to like elements.

Described herein in an example embodiment is a mechanism that employs a beacon for advertising interface. As used herein, an interface refers to a particular radio having a frequency band/channel. The beacon advertises for all of the interfaces, channels used by the interfaces and tree data for each interface. In an example embodiment, a beacon is sent on all the available interfaces. This allows nodes to learn about other interfaces without listening on that frequency, band/channel. For example, when an Access Point (AP) has only two radio interfaces, for example an 802.11a and 802.11b interfaces (sometimes referred to herein as 11a and 11b interfaces, respectively) and a spanning tree exists only on the 11a interface, an example beacon suitably comprises the following:

```
***************************** (Start of beacon)
  Interface: 11a; Channel: 161; Tree: Default Spanning
  Interface: 11b; Channel:   6; Tree: None
***************************** (End of beacon).
```

Note that this concept is extensible to adding more interfaces by just adding more entries to the beacon. For example, if the AP had three interfaces, two 11a interfaces and an 11b interface, an example beacon suitably comprises the following:

```
***************************** (Start of beacon)
  Interface: 11a (radio 1); Channel: 161; Tree: Control Plane, ...
  Interface: 11a (radio 2); Channel: 149; Tree: (some extra trees)
  Interface: 11b;          Channel:   6; Tree: No spanning trees
***************************** (End of beacon).
```

Each beacon is processed as an individual beacon. In the above example, the control plane tree is processed just as it would be done if the beacon was received on the 11a radio on channel 161. By processing this beacon a MAP can determine that there is the possibility that a tree can be generated on the 11b radio using the parent MAP's channel 6. As will be described herein, the aforementioned beacons can be employed to provide seamless tree movement in DFS (Dynamic Frequency Selection) domains.

Referring to FIG. 1, there is illustrated an example of an apparatus 100 configured in accordance with an example embodiment. Apparatus 100 comprises a first wireless interface 102 and a second wireless interface 104. Interface control logic 106 is operable to control the operation of first wireless interface 102 and second wireless interface 104. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Control logic may be implemented as part of a radio resource module (MMP) associated with apparatus 100. As illustrated, control logic 106 is located within apparatus 100; however, in an example embodiment such as an AP using LWAPP (Lightweight Access Point Protocol) control logic 106 may distributed or located external to apparatus 100.

In an example embodiment, apparatus 100 is employed to implement a Mesh Access Point (MAP). In operation, interface control logic 106 determines the interface, frequency/channel, and spanning tree for wireless interfaces 102, 104. Interface control logic 106 is configured to have each interface 102, 104 send a beacon that advertises all of the interfaces along with corresponding frequency/channel and spanning tree data. For example, if wireless interface 102 is an 11a interface operating on channel 161 associated with the default spanning tree, and wireless interface 104 is an 11b interface operating on channel 6 and is not coupled to a spanning tree, a beacon would suitably comprise the following information:

```
***************************** (Start of beacon)
  Interface: 11a; Channel: 161; Tree: Default Spanning
  Interface: 11b; Channel:   6; Tree: None
***************************** (End of beacon).
```

The beacon would be transmitted by wireless interface 102 and wireless interface 104.

In an example embodiment, interface control logic 106 is responsive to beacons received by wireless interface 102 and/or wireless interface 104 to configure either wireless interface 102 and/or wireless interface 104 to establish communication with the device sending the beacon. For example, if another wireless device, such as a parent MAP, sends a beacon as described above on both an 11a interface on channel 161 and an 11b interface on channel 6, a child MAP receiving the beacon on the 11a interface can learn about the parent MAP's secondary 11b interface and channel from the beacon.

For example, if the above beacon is received on wireless interface 102 (e.g., the primary interface of a child MAP), wireless control logic 106 can determine from the beacon that the default spanning tree for the parent MAP is on an 11a interface on channel 161 and can configure wireless interface 102 accordingly. If wireless interface 102 loses a connection with the parent MAP, from the previously received beacons, wireless interface control logic 106 can determine that it can communicate with the parent MAP on channel 6 of the 11b. Accordingly, wireless control logic 106 can configure wireless interface 104 to communicate with the parent MAP on channel 6 of the 11b interface. The child MAP can then inform the parent map via wireless interface 104 to communicate on channel 6 of the 11b interface. The child MAP may also move any spanning tree that was on the primary interface to the secondary interface. This may also allow wireless control logic to acquire data on other available interfaces for the parent MAP. This can save time by eliminating channel scanning when a connection on an interface is lost.

The parent and/or child MAP may inform a network controller suitably configured for selecting the operating frequency of a RAP of the inability of the child AP to use the primary interface channel. The network controller may select a new channel for the RAP. The new channel data can be communicated to the child MAP via the secondary interface, and the child MAP can configure its primary interface accordingly.

In an example embodiment, apparatus 100 is employed by a MAP that is both a child node and a parent node. Beacons sent by the MAP can facilitate communications between both parent and child. Similarly, beacons received by the MAP can allow the MAP to move a sub-tree without performing channel scanning. An example is illustrated in FIG. 2 herein.

Figure 2:
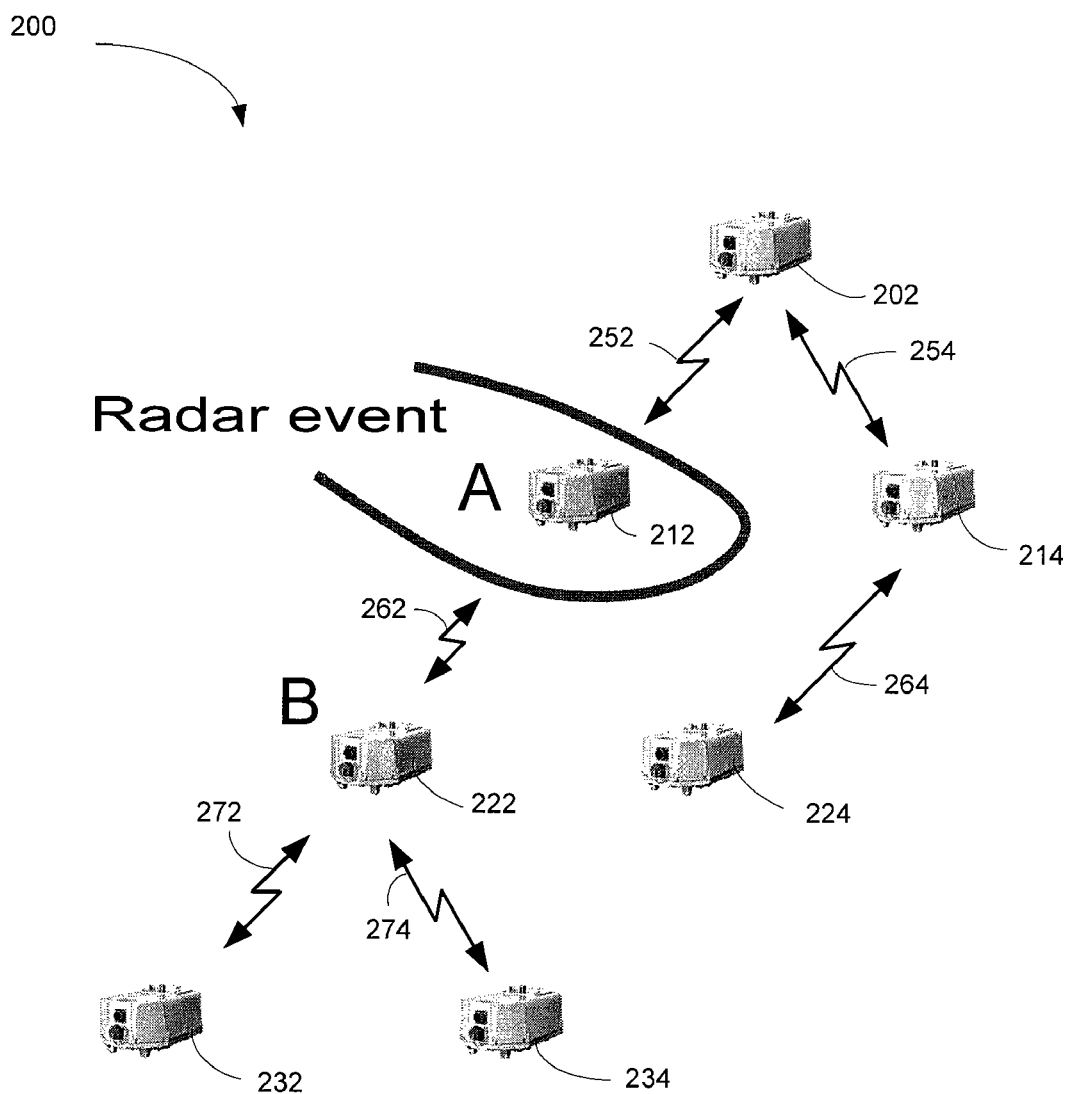

FIG. 2 illustrates an example of a Mesh Network 200 configured to operate in a Dynamic Frequency Selection (DFS) environment. In the illustrated example, Mesh AP 202 is the root access point (RAP) for the sub-tree. Mesh AP 202 communicates with Mesh APs 212, 214 on wireless links 252, 254 respectively. Mesh AP (A) 212 is the parent AP for Mesh AP (B) 222. Mesh APs 212 and 214 communicates via wireless link 262. Mesh AP 222 is the parent AP for Mesh APs 232, 234 and communicates with them on wireless links 272, 274 respectively. Mesh AP 214 is the parent AP for Mesh AP 224 and communicates with Mesh AP 224 via wireless link 264.

For example, if Mesh AP 212 can receive beacons from Mesh AP 202 that enables Mesh AP 212 to determine that Mesh AP 202 has two interfaces, the first wireless interface is an 11a interface operating on channel 161 is associated with the control plane tree and the second wireless interface is an 11b interface operating on channel 6 with no spanning trees. If for some reason Mesh AP 212 is unable to communicate with Mesh AP 202, Mesh AP 212 can determine from the beacons the second interface for Mesh AP 202.

For purposes of this example, the 11a (primary) interface may be subject to regulatory requirements such as radar detection. If radar is detected on the 11a interface, a Mesh AP stops using the 11a interface. It is also assumed for this example that no such requirements apply to the 11b (secondary) interface.

For example, Mesh APs 202 and 212 will periodically send beacons containing data about all interfaces. If Mesh AP 212 detects radar on 11a interface, Mesh AP 212 stops transmitting on the 11a interface. Mesh AP 212 determines from beacons received from Mesh AP 202 that Mesh AP 202 has an 11b channel on its secondary interface. Mesh AP 212 selects the 11b channel as the new backhaul channel for operation and establishes a link with Mesh AP 202 using the 11b channel. Mesh AP 202 would then send a beacon on the second wireless interface indicating that the first interface is an 11a interface on channel 161 and the control tree has moved (and may further include other data indicating radar was detected on the channel) and that the control plane tree has moved to the second wireless interface, an 11b interface on channel 6. No packet reordering is performed and Mesh AP 212 can use the same security key.

Mesh AP 212 can also determine from previously sent beacons the secondary interface for Mesh AP 222. Mesh AP 212 can send a beacon on its own secondary interface to inform Mesh AP 222 how to reconnect to the spanning tree. Mesh AP 222 will switch to follow the control plane on the 11b interface in response to receiving the beacon.

From the foregoing, Mesh AP 222 can determine that the spanning tree moved without having to scan channels. Mesh AP 222 can continue to broadcast the control plane on 11a channel 161 (for example to Mesh APs 232, 234) if it doesn't detect radar, even though the control plane on link 262 between Mesh AP 212 and Mesh AP 222 has moved to the 11b interface. Alternatively, Mesh AP 222 can change the entire tree to 11b depending on the configuration. In either case, the spanning tree remains intact.

In an example embodiment, to recover from the loss of the 11a channel due to radar, Mesh AP 212 can send a notification to a wireless controller (not shown) for the network segment informing the wireless controller that radar was detected on channel 161 of the 11a interface. In an example embodiment, the wireless controller has built-in knowledge of the frequency distribution of the network and can select a radar-free channel with low interference. In an example embodiment the controller selects the channel randomly. In an example embodiment, the wireless controller changes the channel of the root access point (RAP) to a safe channel (for example channel 149), in which case all Mesh APs on the tree will change their control plane to channel 149. Mesh AP 212 would switch to its first wireless interface to the new channel (for example channel 149). Upon switching to the new channel, Mesh AP 212 would send a beacon with the new channel assignments on all of its wireless interfaces, such as, the first wireless interface is an 11a interface on channel 149 with the control plane tree, and second wireless interface is an 11b channel with no spanning trees.

To comply with regulatory requirements, Mesh AP 212 may scan the new channel for a predetermined amount of time before using it. For example, in a DFS environment, a master Mesh AP scans a channel for sixty seconds before using the channel. After scanning the channel for sixty seconds, the master Mesh AP can instruct child Mesh APs to operate on the channel. The child AP can immediately switch to the new channel (for communicating with the master Mesh AP) and continue scanning. For example, if Mesh AP 202 changes its 11a interface to channel 149. Mesh AP 202 scans the channel for 60 seconds before using it. While the channel is being scanned, the communication link 252 between APs 202, 212 is maintained on the 11b interface. After the scan by Mesh AP 202 is complete, Mesh AP 202 notifies Mesh AP 212 to switch to channel 149. Mesh AP 212 can immediately switch to channel 149 for link 252; however, Mesh AP 212 maintains the 11b interface for link 262 and scans the channel for sixty seconds before changing link 262 from the 11b interface to channel 149 on the 11a interface. Thus, the change of the spanning tree link propagates from the top of the tree (Mesh AP 202) to the bottom of the tree (Mesh APs 232, 234).

It should also be noted that a Mesh AP may switch to another Mesh AP on the spanning tree instead of switching to the new channel. For example, Mesh AP 222 may determine that Mesh AP 224 provides better throughput, thus Mesh AP 222 may associate with Mesh AP 224 instead of switching to the new channel.

Moreover, the aforementioned technique can be employed if multiple events (such as radar events) occur. For example, if Mesh APs 212 and 214 both experience a radar event, their sub-trees can converge independent of each other (that is Mesh AP 212's sub-tree will converge independent of Mesh AP 214's sub-tree). If multiple events occur on the same tree (for example Mesh AP 212 experiences a radar event and then Mesh AP 222 experiences a radar event), the Mesh AP that is higher up in the spanning tree (e.g. Mesh AP 212) switches to its parent Mesh AP's (Mesh AP 202) 11b channel and instructs the Mesh AP that is lower in the spanning tree (Mesh AP 222) to change to the 11b channel of Mesh AP 202. If multiple radar events are observed on a tree, all nodes (e.g. Mesh APs 212, 222, 232, 234) switch to their parents 11b channel independently depending on the sequence of the radar events. Because each Mesh AP receives its parent's 11b channel on its secondary channel (e.g. Mesh AP 212 would receive a beacon from Mesh AP 202 on Mesh AP 212's secondary channel), each Mesh AP follows its parent Mesh AP enabling the tree to converge.

Figure 3:
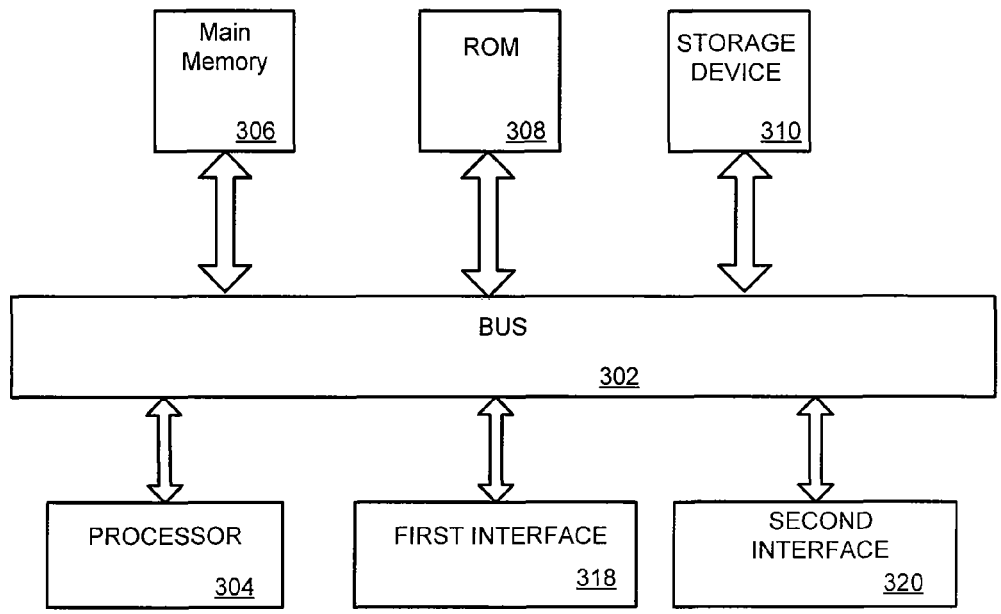

FIG. 3 is a block diagram that illustrates a computer system 300 upon which an example embodiment may be implemented. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304. Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the example embodiment is related to the use of computer system 300 for seamless tree creation and movement. According to an example embodiment, seamless tree creation and movement is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 304 for execution. For example, the instructions may initially be borne on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306 from which processor 304 retrieves and executes the instructions. The instructions received by main memory 306 may optionally be stored on storage device 310 either before or after execution by processor 304.

In an example embodiment, computer system 300 also includes a first wireless communication interface 318 and a second wireless communication interface 320 coupled to bus 302. Communication interfaces 318, 320 provide a two-way wireless communication coupling computer system 300 to a network.

In an example embodiment, processor 304 provides instructions for configuring first communication interface 318 and second communication interface 320. For example, first wireless communication interface 318 can be configured to operate using a first protocol, e.g. the 802.11a protocol, on a selected channel (e.g. channel 161) and may be designated the communication interface for a spanning tree. Second wireless communication interface 320 can be configured to operate using a second wireless protocol, e.g. the 802.11b protocol, on a selected channel (e.g. channel 5) with no spanning tree links. As described herein processor 304 can send beacons comprising configuration data for the first and second interfaces 318, 320 on both interfaces 318, 320. Similarly, processor 304 can receive beacons from other devices via the first wireless communication interface 318 and the second communication interface 320. As described herein, processor 304 can change the configuration of first communication interface 318 and/or second communication interface 320 in response to detected events, such as radar detection or determining a channel is too noisy, and/or loss of a signal from another device. Processor 304 can also change the configuration of first communication interface 318 and/or second communication interface 320 in response to beacons received from another device, e.g. from a parent Mesh AP, indicating the other device is changing to a different channel. For example, processor 304 can change the channel on first wireless communication interface 318 from channel 161 to channel 148 in response to a beacon received on second communication interface 320.

In view of the foregoing structural and functional features described above, methodologies in accordance with example embodiments will be better appreciated with reference to FIGS. 4 and 5. While, for purposes of simplicity of explanation, the methodologies of FIGS. 4 and 5 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required. The methodologies described herein are suitably adapted to be implemented in hardware, software, or a combination thereof.

FIG. 4 is a block diagram of a method 400 for a dynamic frequency selection device to change channels without disrupting an associated spanning tree. At 402, the device broadcasts beacons on the first and second interfaces advertising the current configuration of the first and second interfaces. For example, as illustrated herein supra, if the first wireless interface is using the 802.11a protocol, operating on channel 161 and is coupled to the default spanning tree, and the second interface is using the 802.11b protocol and operating on channel 6 with no associated spanning trees, a beacon may be sent as follows:

--Start of Beacon:
    Interface: 11a; Channel: 161; Tree: Default Spanning
    Interface: 11b; Channel:   6; Tree: None
--End of Beacon.

This beacon is sent on all (in this example the first and second) interfaces.

At 404, the device changes at least one of the interfaces responsive to an event. For example, a radar signal may be detected on the first interface. Other examples include but are not limited to interference, signal quality degradation, and/or loss of signal with another device such as a parent MAP.

At 406 the device broadcasts the interface change of step 404. For example, if the first interface loses its connection with its parent MAP, the second interface can signal the parent MAP on the second interface. The second interface may switch channels if it is not currently on the parent MAP's secondary channel. For example, a beacon similar to the following may be sent on the second interface:

```
--Start of Beacon
    Interface 11a; Channel 161; Control Tree Moved
    Interface 11b; Channel   6; Control Plane Tree
--End of Beacon.
```

This beacon would indicate to the receiving node that the control plane (spanning tree) has moved to Channel 6 of the 11b interface. It should be noted that the beacon may not be sent on the first interface because of regulatory compliance (for example after detecting a radar event that Channel 6 of the 11a interface is unavailable). This allows the device to move the spanning tree and communicate the move immediately to other notes, thus reducing any downtime because of the event. The device may also communicate the configuration change to a RAP or a controller coupled to the network, enabling the controller to select a new channel for the device.

At 408, the device receives a new channel assignment for the first channel. The device may randomly select a channel on its own, or may receive a channel assignment from another device. For example, in a Mesh network the device may receive a new channel assignment from a controller in communication with the RAP. In an example embodiment, for example if the new channel is an 11a channel that is to be checked for radar activity before the device can use it, the device continues to maintain the spanning tree on the second interface while verifying the new channel is available. If the new channel is not available, the device can continue to maintain the spanning tree on the second interface and obtain another new channel, until an available channel is found.

At 410, as the device is ready to use the new channel, the device broadcasts the change of status of the first interface on all interfaces (the first and second in this example). The device may also move the spanning tree back to the first interface as well. A beacon similar to the following can be employed:

```
--Start of Beacon:
    Interface: 11a; Channel: 149; Tree: Default Spanning
    Interface: 11b; Channel:  6; Tree: None
--End of Beacon.
```

Nodes receiving this beacon could move their spanning tree to the first interface, an 11a interface on Channel 149 (or alternatively if a node discovers a better connection it could move to another MAP). At this point, the device has recovered from the event and continues regular operation.

If the device in the above example has multiple 11a interfaces, then the device could merely switch from one 11a interface to another. For example if the device was configured with three interfaces as follows:

```
Radio 1: Interface 11a; Channel 161; Trees (Control Plane)
Radio 2: Interface 11a; Channel 149; Trees (some extra trees)
Radio 3: Interface 11b; Channel   6; Trees (None).
```

The device could move the spanning tree from the first 11a interface to the second 11a interface by broadcasting beacons on the second and third interfaces. At 402, a beacon such as the following would be sent:

```
Radio 1: Interface 11a; Channel 161; Trees (Control Plane)
Radio 2: Interface 11a; Channel 149; Trees (some extra trees)
Radio 3: Interface 11b; Channel   6; Trees (None).
```

At 406, a beacon such as the following would be sent:

```
Radio 1: Interface 11a; Channel 161; Trees (Control Plane Moved)
Radio 2: Interface 11a; Channel 149; Trees (Control Plane and some
extra trees)
Radio 3: Interface 11b; Channel   6; Trees (None).
```

Devices receiving the beacon sent at 406 would change their spanning tree to the 11a interface, channel 149, responsive to receiving the beacon. Steps 408, 410 could be skipped in this scenario. Broadcasting beacons on the secondary channel(s) enables another device (such as a parent or child MAP) to reconnect with the device by reducing the amount of time the other device has to scan to find the device.

FIG. 5 is a block diagram of a method 500 for a dynamic frequency selection device to change channels responsive to receiving a beacon indicating an associated node has changed channels. For example, method 500 can be implemented on a Mesh AP in order to facilitate movement of the spanning tree.

At 502, the device is communicating with an associated device on its primary interface. While communicating with the device on its primary interface, the device receives beacons having data indicating the associated device's primary and secondary interfaces.

At 504, the device determines the primary interface with the associated device is unavailable. For example, the device may determine it can no longer communicate with the associated device, e.g., it no longer receives responses from the associated device. As another example, the device may receive a beacon from the associated device on the secondary interface indicating that the spanning tree has moved to a secondary interface (which could be either the device's secondary interface or the associated device's secondary interface—which may be different than the device's secondary interface). In an example embodiment, upon losing communication with the associated device on the primary interface, the device may attempt to communicate with the associated device via the associated device's secondary channel which the device acquired from previously received beacons.

At 506, the device communicates with the associated device via the secondary interface. If the primary channel comprised a spanning tree that the device belonged to, the spanning tree can be moved to the secondary channel, thus limiting the amount of time the spanning tree link is lost.

At 508, the device receives data from the associated device containing data for the associated device's new primary interface. This data may be received from a beacon received on the secondary interface. Any spanning trees that were moved to the secondary interface can be moved to the new primary interface.

At 510, the device switches to the associated device's new primary interface. If the primary device is on a spanning tree link below the associated device, the device may use the new primary interface immediately because the associated device would have scanned the new interface prior to sending the beacon; however, the device would have to scan the channel (for example to ensure it is not conflicting with a radar) before moving any child nodes. For example, if there are three Mesh AP's, AP1 which is a parent to AP2, a parent of AP3; then AP2 can immediately switch to the new channel upon receiving a beacon from AP1 to use the new channel; however, AP2 will scan the channel before instructing AP3 to switch to the new channel. If a spanning tree was moved to a secondary interface, it can be moved to the new primary interface. Alternatively, if the device can find a new connection to a second associated device that is superior to the new primary interface of the associated device, the device can switch to the second associated device instead of moving to the new primary channel.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a first interface configured to use a first protocol on a first channel and being configured to service a spanning tree;
   a second interface configured to use a second protocol on a second channel; and
   control logic coupled to the first interface and second interface, the control logic is operable to control and configure the first interface and the second interface;
   wherein the control logic is operable to send a first beacon on the first interface and the second interface;
   wherein the first beacon comprises data containing a current configuration of the first interface and a current configuration of the second interface;
   wherein the data for the current configuration of the first interface comprises data representative of the first protocol, data representative of the first channel and data representative of the spanning tree serviced by the first interface;
   wherein the data for the current configuration of the second interface comprises data representative of the second protocol and the second channel;
   wherein the control logic is configured to receive a signal from a node belonging to the spanning tree on the first interface, the signal comprising data representative of a channel compatible with the second interface that the node belonging to the spanning tree is reachable;
   wherein the control logic is configured to detect an event on the first interface, the control logic is responsive to detecting the event to cease communications on the first interface;
   wherein the controller is configured to select a channel on the second interface for servicing the spanning tree responsive to detecting the event;
   wherein the control logic transfers servicing of the spanning tree to the selected channel on the second interface; and
   wherein the control logic is configured to send a second beacon on the second interface on the channel compatible with the second interface that the node belonging to the spanning tree is reachable, the second beacon including data indicating that the servicing of the spanning tree has moved to the selected channel on the second interface, the second beacon further comprising data representative of the selected channel on the second interface that is servicing the spanning tree.

2. The apparatus of claim 1, wherein the control logic changes the configuration of the second interface to enable to the second interface to communicate with an associated wireless device.

3. The apparatus of claim 2, wherein the configuration of the second interface is changed to a third channel.

4. The apparatus of claim 1, wherein the control logic selects a new channel for the first interface and configures the first interface to operate on the new channel;
   wherein the control logic is configured to send a third beacon on the selected channel, the third beacon comprising data representative of the configuration of the first interface and the second interface;
   wherein the data for the current configuration of the first interface comprises data representative of the first protocol, the new channel, and data indicating that servicing of the spanning tree has moved to the new channel on the first interface; and
   wherein the data for the current configuration of the second interface comprises data representative of the second protocol and the second channel.

5. The apparatus of claim 4, wherein the control logic has the first interface scan the new channel to detect an event for a predetermined time period before beginning operation on the new channel.

6. The apparatus of claim 1, wherein the event is detection of a radar signal.

7. The apparatus of claim 1, wherein the selected channel on the second interface is a different channel than the channel compatible with the second interface that the node belonging to the spanning tree is reachable.

8. A method, comprising:
   wirelessly communicating with a device on a first interface, the device belonging to a spanning tree that is serviced by the first interface;
   receiving a first beacon from the device on the first interface, the beacon comprising data representative of a channel compatible with a second interface that the device is reachable;
   detecting an event that inhibits communications on the first interface;
   selecting a channel for servicing the spanning tree of the second interface;
   configuring the second interface to communicate on the channel that the device is reachable;
   sending a second beacon on the second interface on the channel compatible with the second interface that the device is reachable, the second beacon comprising data indicating the spanning tree has moved to the selected channel on the second interface;
   determining a new channel assignment for the first interface while servicing the spanning tree on the second interface;
   moving the spanning tree to the new channel on the first interface;
   sending a third beacon on the selected channel on the second interface, the third beacon comprising data indicating the spanning tree has moved to the new channel on the first interface; and
   servicing the spanning tree on the new channel on the first interface.

9. The method of claim 8, further comprising waiting for the new channel to be clear a predetermined time period before sending the third beacon.

10. The method of claim 8, wherein the data representative of a configuration for the second interface comprises a channel and a protocol for a second interface.

11. The method of claim 8, wherein the event is a radar signal.

12. The method of claim 8, wherein the channel compatible with the second interface that the device is reachable is a different channel than the selected channel on the second interface.

13. An apparatus, comprising:
- a first interface configured to use a first protocol on a first channel and being configured to service a spanning tree, wherein the first interface is operable to communicate with a parent node and a child node belonging to the spanning tree;
- a second interface configured to use a second protocol on a second channel; and
- control logic coupled with the first interface and the second interface, the control logic being operable to control and configure the first interface and the second interface;
- wherein the control logic is operable to send a first beacon on the first interface and the second interface;
- wherein the beacon comprises data containing a current configuration of the first interface and a current configuration of the second interface;
- wherein the data for the current configuration of the first interface comprises data representative of the first protocol, data representative of the first channel and data representative of the spanning tree serviced by the first interface;
- wherein the data for the current configuration of the second interface comprises data representative of the second protocol and the second channel;
- wherein the control logic is configured to receive a signal from the parent node belonging to the spanning tree on the first interface, the signal comprising data representative of a channel compatible with the second interface that the parent node is using for communications;
- wherein the control logic is configured to receive a signal from the child node belonging to the spanning tree on the first interface, the signal comprising data representative of a channel compatible with the second interface that the child node is using for communications;
- wherein the control logic is configured to detect an event inhabiting communication on the first interface, the control logic is responsive to detecting the event to cease communications on the first interface;
- wherein the control logic is configured to select the channel on the second interface for the parent node for servicing the spanning tree responsive to detecting the event;
- wherein the control logic sends a second beacon to the parent node via the second interface that the spanning tree has moved to the second interface; and
- wherein the control logic sends on the channel on the second interface the child node is using for communications a third beacon indicating that the spanning tree has moved to the channel the parent node is using for communications on the second interface.

14. An apparatus, comprising:
- a first interface configured to use a first protocol on a first channel and being configured to service a spanning tree, wherein the first interface is operable to communicate with a parent node and a child node belonging to the spanning tree;
- a second interface configured to use a second protocol on a second channel; and
- control logic coupled with the first interface and the second interface, the control logic being operable to control and configure the first interface and the second interface;
- wherein the control logic is operable to send a first beacon on the first interface and the second interface;
- wherein the first beacon comprises data containing a current configuration of the first interface and a current configuration of the second interface;
- wherein the data for the current configuration of the first interface comprises data representative of the first protocol, data representative of the first channel and data representative of the spanning tree serviced by the first interface;
- wherein the data for the current configuration of the second interface comprises data representative of the second protocol and the second channel;
- wherein the control logic is configured to receive a signal from the parent node belonging to the spanning tree on the first interface, the signal comprising data representative of a channel compatible with the second interface that the parent node is using for communications;
- wherein the control logic is configured to receive a signal from the child node belonging to the spanning tree on the first interface, the signal comprising data representative of a channel compatible with the second interface that the child node is using for communications;
- wherein the control logic switches a spanning tree link with a parent node to a channel on the second interface responsive to receiving a signal from the parent node on one of the group consisting of the first interface and the second interface indicating that the parent node has moved the spanning tree to the channel on the second interface; and
- wherein the control logic maintains a spanning tree link with the child node on the first interface while employing a channel on the second interface for the link with the parent node.

\* \* \* \* \*